(12) United States Patent
Griffin et al.

(10) Patent No.: US 8,711,554 B2
(45) Date of Patent: Apr. 29, 2014

(54) PORTABLE ELECTRONIC DEVICE HOUSING INCLUDING HINGE

(75) Inventors: Jason Tyler Griffin, Kitchener (CA); Steven Henry Fyke, Waterloo (CA); Martin Philip Riddiford, Dulwich (GB); Benjamin John Henley, London (GB)

(73) Assignee: BlackBerry Limited, Waterloo (CA)

( * ) Notice: Subject to any disclaimer, the term of this patent is extended or adjusted under 35 U.S.C. 154(b) by 158 days.

(21) Appl. No.: 13/276,980

(22) Filed: Oct. 19, 2011

(65) Prior Publication Data
US 2013/0100601 A1 Apr. 25, 2013

(51) Int. Cl.
*G06F 1/16* (2006.01)
(52) U.S. Cl.
USPC ....... 361/679.27; 248/550; 455/557; 206/335
(58) Field of Classification Search
USPC ................. 312/223.1, 223.2, 325; 248/206.2, 248/278.1, 279.1, 157, 550; 361/679.55, 361/679.31, 679.26, 679.27, 679.28, 361/679.29, 679.33, 679.41, 679.3, 679.56, 361/679.09, 679.17, 679.08, 679.23, 361/679.47; 349/106, 109; 455/575.3, 455/575.4, 572, 575.1, 570, 569.1, 557, 455/552.1, 574, 348; 206/216, 373, 379, 206/232, 579, 335, 308.1, 509, 310, 723, 206/706, 722; 345/419, 1.3, 156, 173
See application file for complete search history.

(56) References Cited

U.S. PATENT DOCUMENTS

| | | | |
|---|---|---|---|
| 5,835,852 A | 11/1998 | Bundgardt | |
| 7,565,720 B1 | 7/2009 | Ligtenberg | |
| 2006/0270469 A1* | 11/2006 | Godston et al. | 455/575.3 |
| 2010/0075717 A1 | 3/2010 | Ou | |
| 2013/0083275 A1* | 4/2013 | Al et al. | 349/106 |

FOREIGN PATENT DOCUMENTS

EP 1843052 A1 10/2007

OTHER PUBLICATIONS

Extended European Search report mailed Mar. 19, 2012; in corresponding application No. 11185847.8.
Examination report mailed Sep. 11, 2013, in corresponding European patent application No. 11185847.8.

* cited by examiner

*Primary Examiner* — Hung Duong
(74) *Attorney, Agent, or Firm* — Novak Druce Connolly Bove + Quigg LLP

(57) ABSTRACT

A portable electronic device includes a hinge assembly comprising an axle, the hinge assembly coupling a first mating end of a first housing to a second mating end of a second housing, the second housing being movable relative to the first housing from an open position in which the axle is in a first position near to the first mating end and the second mating end and a folded position in which the axle is in a second position spaced from the first mating end and the second mating end such that the first mating end and the second mating end are movable toward one another to move the portable electronic device to a partially open position for clipping to an object; and a processor in electrical communication with electrical components in one of the first housing and the second housing.

15 Claims, 15 Drawing Sheets

PORTABLE ELECTRONIC DEVICE HOUSING INCLUDING HINGE

TECHNICAL FIELD

The present application relates to two-part portable electronic device housings including hinges for coupling the housing together.

BACKGROUND DISCUSSION

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, tablets and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs, smart telephones or tablets are generally intended for handheld use and ease of portability. Smaller devices are generally desirable for portability. Touch screen devices may be useful on handheld devices as such handheld devices are small and are therefore limited in space available for user input and output devices.

BRIEF DESCRIPTION OF THE DRAWINGS

Embodiments of the present application will now be described, by way of example only, with reference to the attached Figures, wherein.

DETAILED DESCRIPTION

Figure 1:
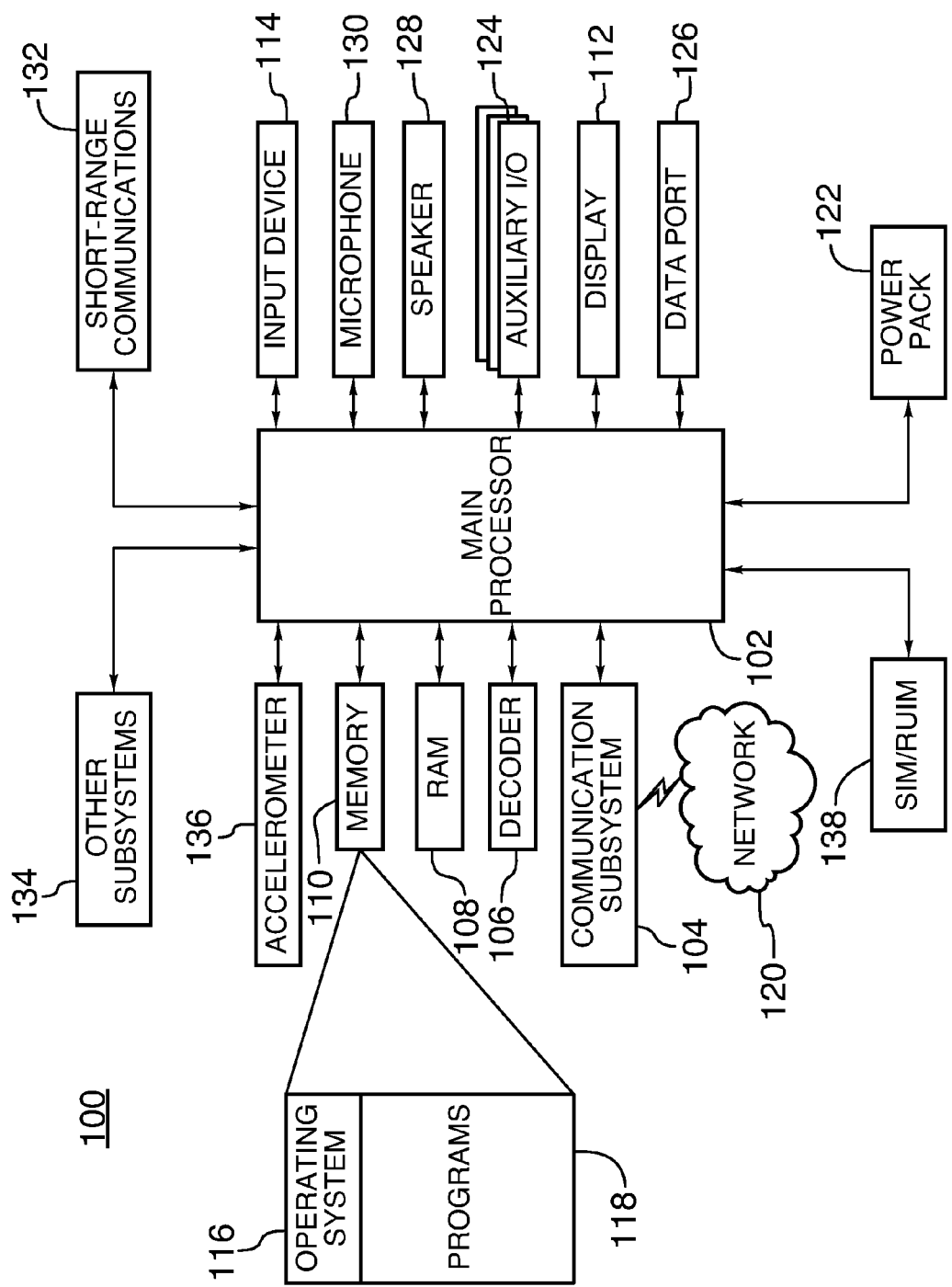
FIG. 1 is a simplified block diagram of components including internal components of a portable electronic device.

The disclosure generally relates to a portable electronic device that is useable as a clip for securing to an object.

In an aspect there is provided a portable electronic device including: a first housing comprising a first end and a first mating end; a second housing comprising a second end and a second mating end; a hinge assembly comprising an axle, the hinge assembly coupling the first mating end of the first housing to the second mating end of the second housing, the second housing being movable relative to the first housing from an open position in which the axle is in a first position near to the first mating end and the second mating end and a folded position in which the axle is in a second position spaced from the first mating end and the second mating end such that the first mating end and the second mating end are movable toward one another to move the portable electronic device to a partially open position for clipping to an object; and a processor in electrical communication with electrical components in one of the first housing and the second housing.

Other aspects and features of the present disclosure will become apparent to those ordinarily skilled in the art upon review of the following description of specific embodiments in conjunction with the accompanying figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

The processor 102 interacts with other components, such as Random Access Memory (RAM) 108, memory 110, an input device 114, an auxiliary input/output (I/O) subsystem 124, the data port 126, a speaker 128, a microphone 130, short-range communications 132, and other device subsystems 134. The processor 102 may interact with an orientation sensor such as an accelerometer 136 that may be utilized to detect direction of gravitational forces or gravityinduced reaction forces. The processor 102 further interacts with a display 112. The display 112 may be a touch-sensitive display or, alternatively, may not be touch-sensitive, such as a liquid crystal display (LCD), for example. A power pack 122, such as one or more rechargeable batteries or a port to an external power supply, powers the portable electronic device 100.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
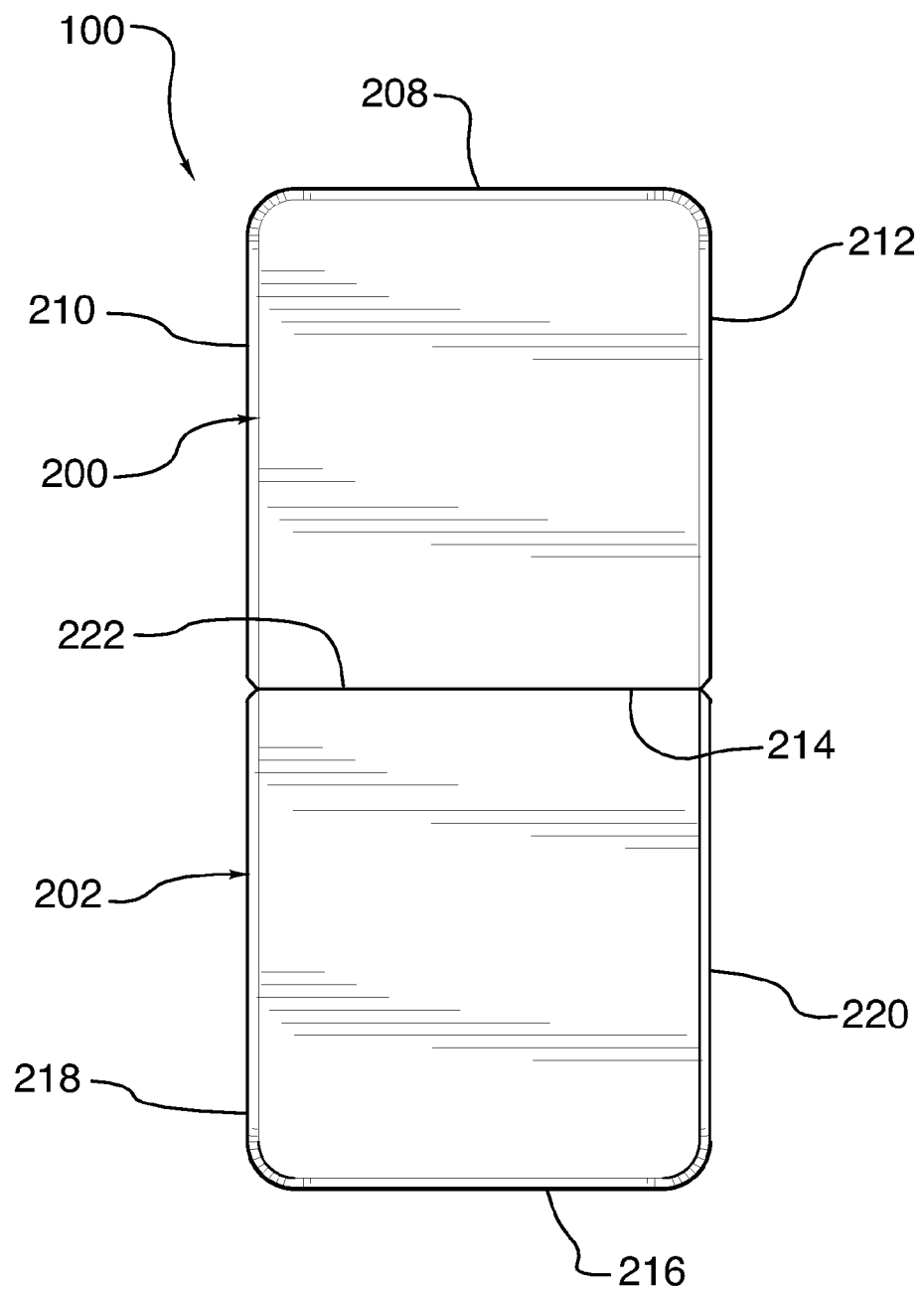
FIG. 2 is a front view of a portable electronic device according to an example, in an open position.
Figure 3:
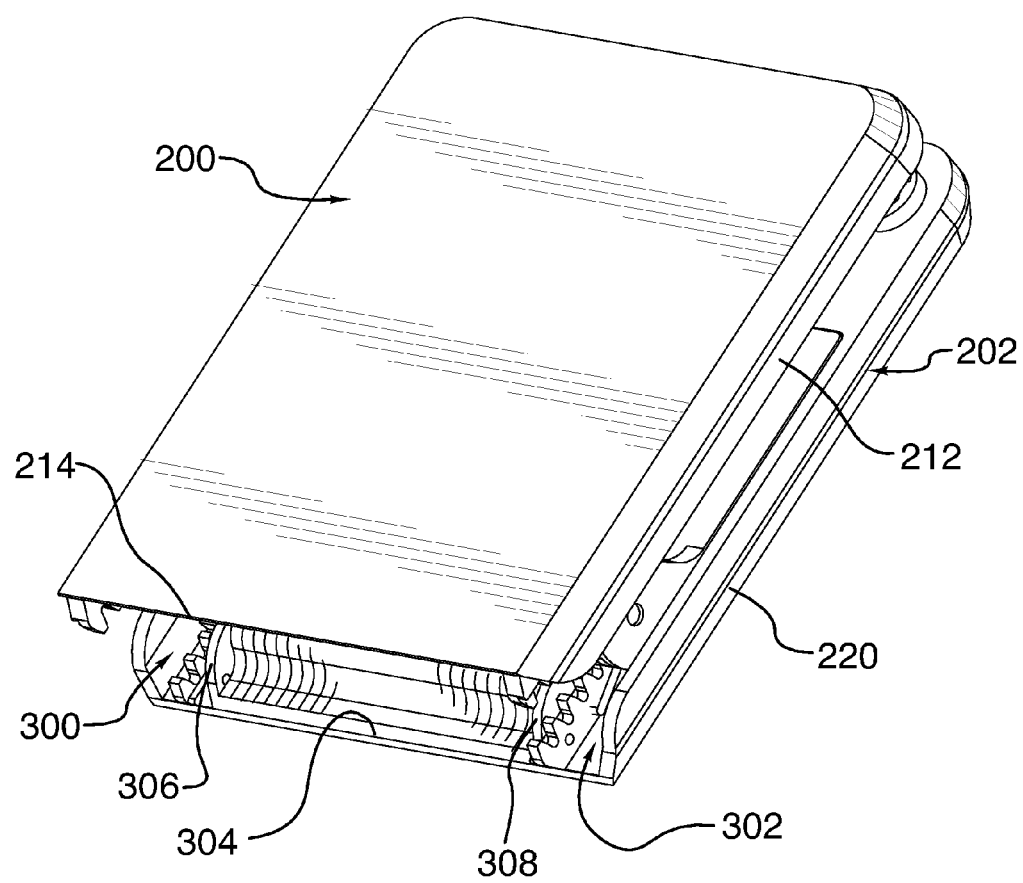
FIG. 3 is an isometric view of the portable electronic device of FIG. 2, in a folded position.

Referring to FIGS. 2 and 3, an example portable electronic device 100 is shown. The portable electronic device 100 includes a first housing 200 and a second housing 202. The portable electronic device 100 is movable from an open position, which is shown in FIG. 2, to a folded position, which is shown in FIG. 3. In this example, the first housing 200 frames a first touch-sensitive display (not shown) and the second housing 202 frames a second touch-sensitive display (not shown).

The touch-sensitive displays may be any suitable touch-sensitive displays, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts or touch events, may be detected by the touch-sensitive displays. The processor 102 may determine attributes of the touch, including a location of a touch.

Other electronic components including the power pack 122 and the processor 102, for example, are generally provided in one of the first housing 200 and the second housing 202. The electrical components of the first housing 200 may be in electrical communication with the electrical components of the second housing 202 through wiring, for example. Alternatively, additional electrical components including an additional power pack 122 and an additional processor 102 may be provided so that the electrical components of the two housings 200, 202 may operate independently. In general, components electrically communicate with one another when the electrical activity in one component affects an electrical activity in another. Electrical communication includes direct electrical contact that enables current flow. In some situations, communication may be electrical or optical or a combination of electrical and optical.

The first housing 200 includes a first end 208, a first pair of sides 210, 212 and a first mating end 214, which is generally opposite the first end 208. Similarly, the second housing 202 includes a second end 216, a second pair of sides 218, 220 and a second mating end 222, which is generally opposite the second end 216. The first mating end 214 and the second mating end 222 may contact one another when the portable electronic device 100 is in the open position, as shown in FIG. 2, or a gap may be provided between the mating ends 214, 222 when the portable electronic device 100 is in the open position.

Figure 4:
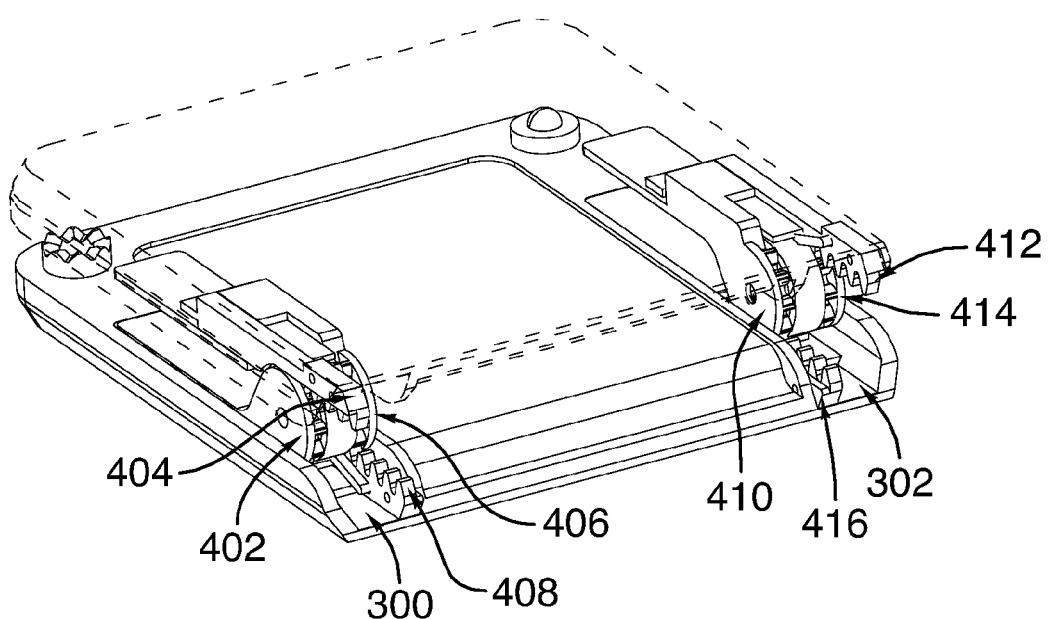
FIG. 4 is an isometric view of portions the portable electronic device of FIG. 2, in a folded position.

As shown in FIGS. 3 and 4, the second housing 202 includes a first channel 300 and a second channel 302 located on an underside surface 304 of the second housing 202. The first channel 300 is provided between the side 218 and a wall 306. The second channel 302 is provided between the side 220 and a wall 308.

Figure 5:
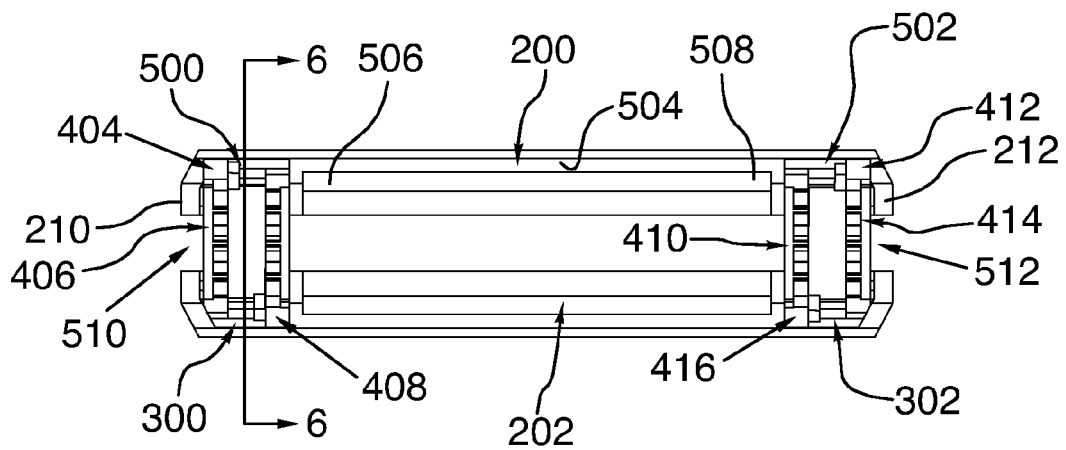
FIG. 5 is an end view of the portable electronic device of FIG. 3.

Similarly, as shown in FIG. 5, the first housing 200 includes a first channel 500 and a second channel 502 located on an underside surface 504 of the first housing 200. The first channel 500 is provided between the side 210 and a wall 506. The second channel 302 is provided between the side 212 and a wall 508.

Figure 6:
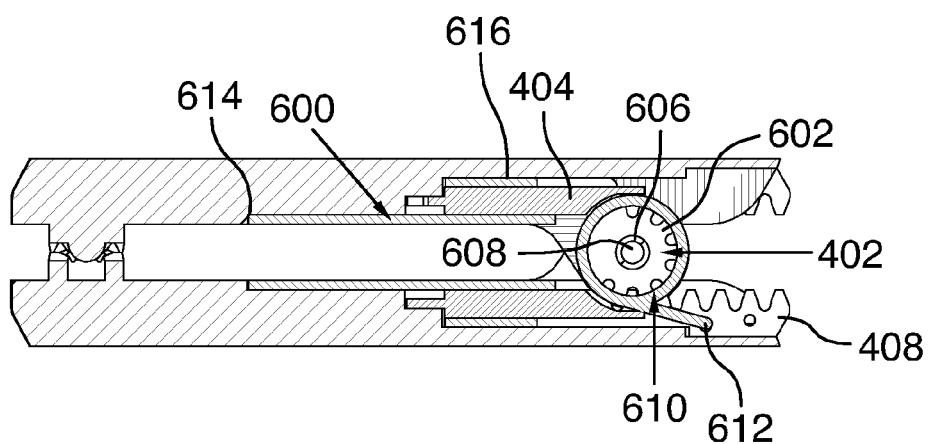
FIG. 6 is a view on 6-6 of FIG. 5.

Referring also to FIGS. 5 and 6, the channels 300 and 500 receive a first hinge assembly 510 and the channels 302 and 502 receive a second hinge assembly 512. The first hinge assembly 510 includes a pair of pinions slidably coupled to the first and second housings 200, 202 for engaging a pair of racks coupled to the first and second housings 200, 202. In particular, referring back to FIG. 4, the first hinge assembly 510 includes an inner pinion 402 and an outer rack 404 coupled to the first housing 200 and an outer pinion 406 and an inner rack 408 coupled to the second housing 202. Similarly, the second hinge assembly 512 includes an inner pinion 410 and an outer rack 412 coupled to the first housing 200 and an outer pinion 414 and an inner rack 416 coupled to the second housing 202. The outer rack 404 and inner rack 408 are fixed relative to the first housing 200 and second housing 202, respectively, and may be formed as single parts therewith. Similarly, the outer rack 412 and inner rack 416 are fixed relative to the first housing 200 and second housing 202, respectively, and may be formed as single parts therewith.

Figure 7:
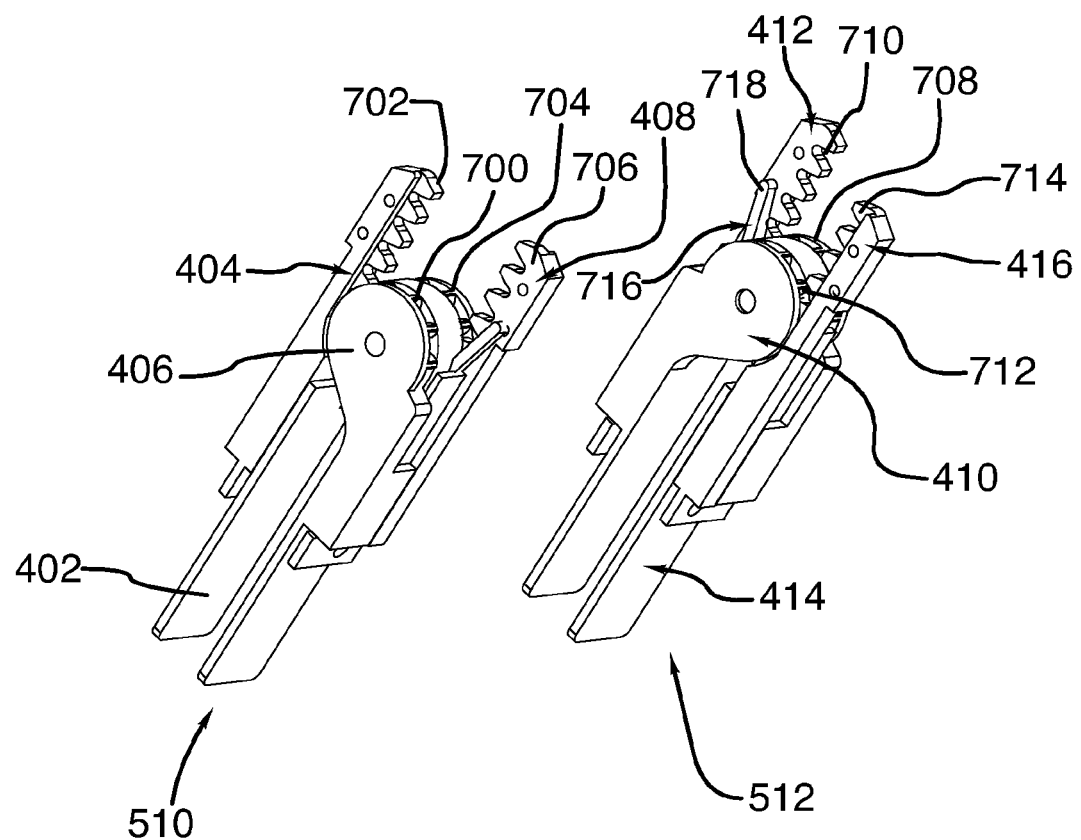
FIG. 7 is an isometric view of the hinge assemblies of FIG. 3 in the folded position.

Referring also to FIG. 7, the outer pinion 406 includes teeth 700 for engaging teeth 702 of the outer rack 404. The inner pinion 402 includes teeth 704 for engaging teeth 706 of the inner rack 408. The second hinge assembly 512 is similarly arranged. The outer pinion 414 includes teeth 708 for engaging teeth 710 of the outer rack 412 and the inner pinion 410 includes teeth 712 for engaging teeth 714 of the inner rack 416.

Figure 8:
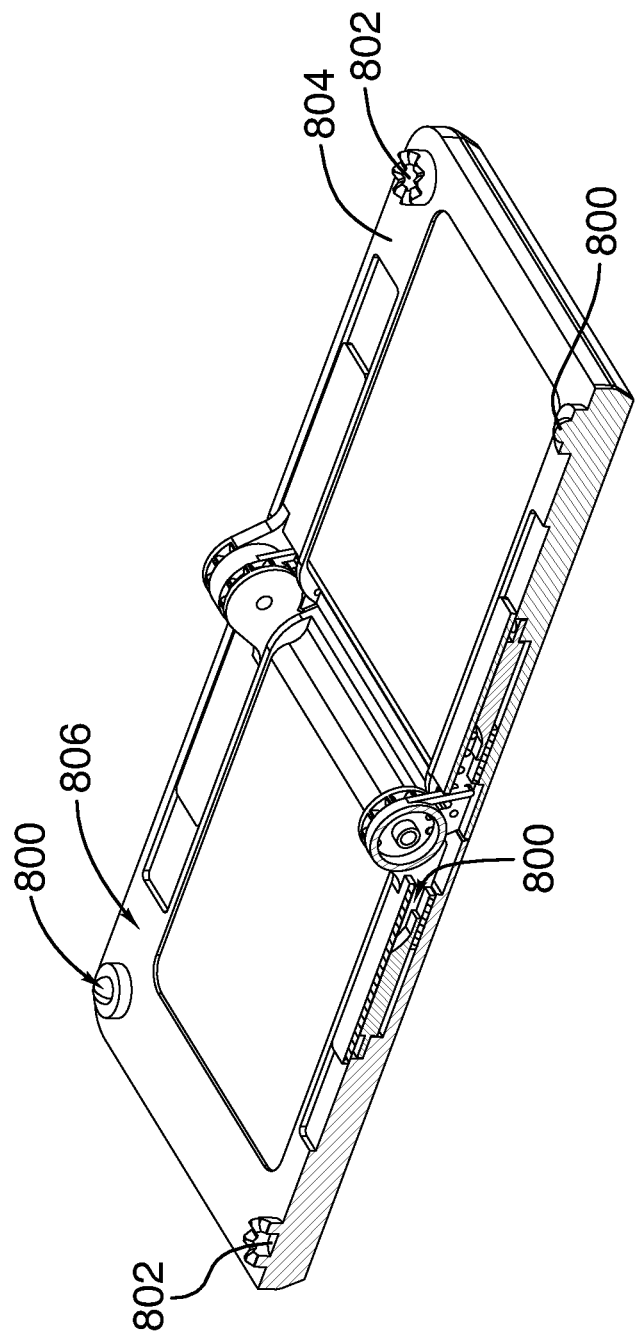
FIG. 8 is an isometric view partly in section of the portable electronic device of FIG. 2.

Referring back to FIGS. 5 and 6, the inner pinion 402 of the first hinge assembly 510 includes an arm 600, which is coupled to the first housing 200, and a pinion body 602 from which the teeth 704 extend. The arm 600 includes a first portion 614 and second portion 616 that are spaced from one another to provide a channel 808, which is shown in FIG. 8, for receiving the outer rack 404. The cooperating shapes of the channel 300 and the arm 600 provide a sliding interface to enable the arm 600 to slide relative to the first housing 200 while remaining coupled thereto. The pinion body 602 further includes an aperture 606 for receiving an axle 608, which extends through the outer pinion 406 to align the pinions 414, 418 relative to one another. The axle 608 couples the pinions 414 and 418 to one another to couple the first housing 200 to the second housing 202. The rack and pinion arrangement of the second hinge assembly 512 is similar to that of the first hinge assembly and therefore, will not be described further.

A spring 610 of the first hinge assembly 510 is located between the inner pinion 402 and the outer pinion 406. Ends 612 of the spring 610 are coupled to the inner and outer racks 408 and 404, respectively. Alternatively, the ends 612 of the spring 610 may be coupled to the first and second housings 200, 202. Similarly, as shown in FIG. 7, a spring 716 of the first hinge assembly 510 is located between the inner pinion 410 and the outer pinion 414. Ends 718 of the spring 716 are coupled to the inner and outer racks 416 and 412, respectively. Alternatively, the ends 718 of the spring 716 may be coupled to the first and second housings 200, 202.

The springs 610, 716 are over-centering springs, which bias the portable electronic device toward the open position when almost open and bias the portable electronic device toward the folded position when almost folded. As discussed herein, however, a spring may include any mechanical apparatus that can exert a force or otherwise bias housings or other components toward positions relative to one another. A spring may be, but need not be, a simple mechanical coil spring.

The hinge assemblies 510, 512 generally function as a rolling hinge including an axle that moves relative to the first and second housings 200, 202 when the portable electronic device 100 is moved between the open position and the folded position.

The first housing 200 may further include projections 800 that extend from a first rear surface 804, which is opposite to the first touch-sensitive display 204, and a second rear surface 806, which is opposite the second touch-sensitive display 206. The projections 800 may engage mating recesses 802, which extend from the first rear surface 804 and the second rear surface 806, when the portable electronic device is in the folded position. Although one projection 800 and one recess 802 are shown on the first rear surface 804 and the second rear surface 806, multiple projections 800 and mating recesses 802 may be provided. Further, projections 800 may be provided on the first rear surface 804 and recesses provided on the second rear surface 806. The projections 800 recesses 802 may be rubber. Alternatively, the projections 600 may be magnets for engaging a ferrous material of the mating recess 602 in order to increase a clamping force between the two housings 200, 202 in the folded position. In other embodiments, projections 800 or recesses 802 may include rough or otherwise textured surfaces that promote frictional engagement with a surface to which the first and second housings 200, 202 may be clipped or clamped.

It will be appreciated that some of the parts described may be partially or wholly concealed in some embodiments by, for example, a flexible cover.

Figure 9:
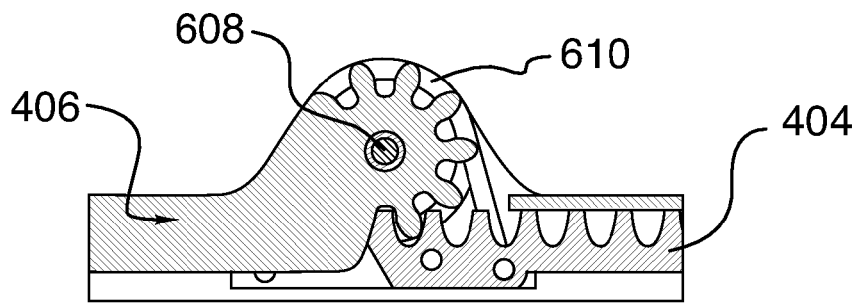
FIGS. 9, 10 and 11 are side views of one of the hinges of FIG. 7 in the open, partially folded or partially open and folded positions, respectively.

Operation of the hinge assemblies 510, 512 of the portable electronic device 100 will now be described with reference to FIGS. 9, 10 and 11. From the open position of FIG. 9, in which the first mating end 214 of the first housing 200 and the second mating end 222 of the second housing 202 abut one another and the first housing 200 and the second housing 202 are generally co-planar, the first housing 200 and the second housing 202 are moved toward one another. As the housings 200, 202 are moved toward one another, the teeth 704 of the inner pinion 402 engage the teeth 706 of the inner rack 408 and the teeth 700 of the outer pinion 406 engage the teeth 702 of the outer rack 404 to move the axle 608 relative to the first and second housings 200, 202.

Figure 10:
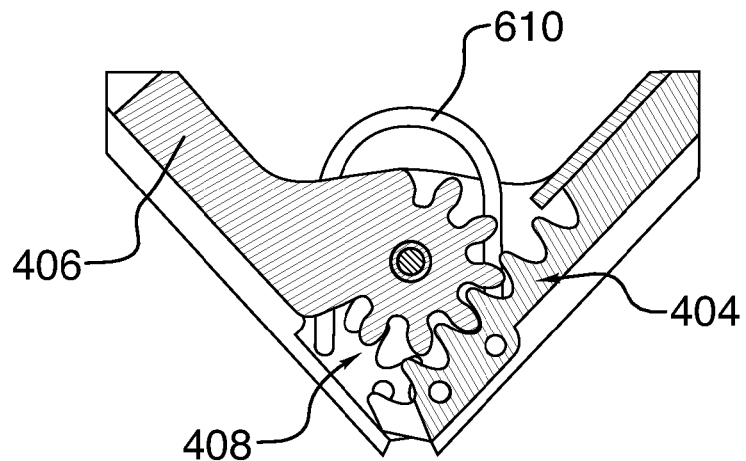
Figure 11:
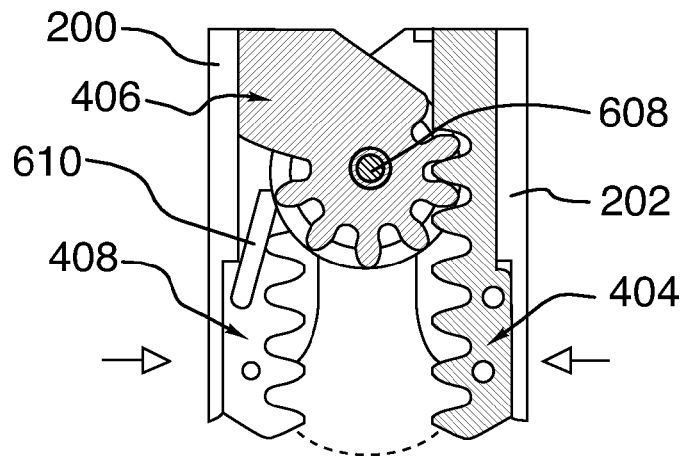

As shown in FIG. 10, the axle 608 continues to move from a first position near the mating ends 214, 222 of the first and second housings 200, 202 toward the first end 208 of the first housing 200 and the second end 216 of the second housing 202 to a second position that is spaced from the mating ends 214, 222 as the first housing 200 and second housing 202 move toward one another. The axle 608 continues to move until the first housing 200 and the second housing 202 reach the folded position of FIG. 11. In the folded position, the axle 608 is spaced from the mating ends 214, 222, as shown. In the present example, the distance that the axle is spaced from the mating ends 214, 222 is approximately one fifth of the length of the portable electronic device 100 when folded. The distance between the first position and the second position may be between 10 and 50 percent of the length of the first housing between the first end 208 and the first mating end 214.

Figure 12:
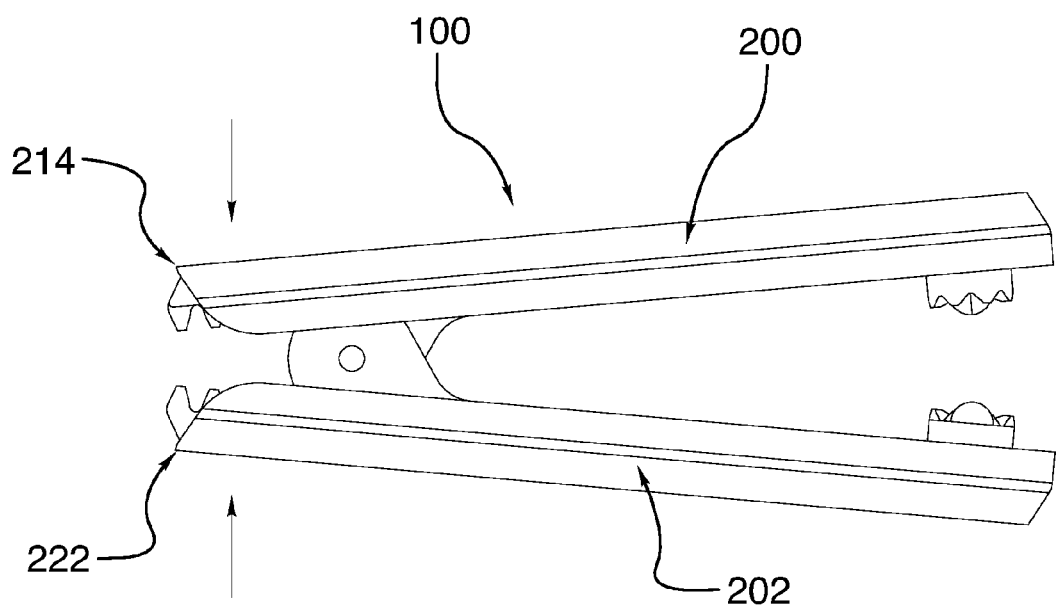
FIG. 12 is a side view of the portable electronic device of FIG. 2 in a partially open position.

In general, in the folded position, the portable electronic device 100 is securable like a clip to an object, such as clothing including a pocket, a sleeve cuff or a waistband, for example, or accessories including a belt, a strap of a bag or a book or a carrying case for a tablet or Smartphone, for example. The portable electronic device 100 may also be securable to an object that is not readily portable or that is not typically moved from place to place in ordinary operation, such as a curtain or a shelf or a charger or a cable. Clipping to an object generally entails having the portable electronic device 100 in a partially open position, such that an object can be inserted or otherwise placed between the housings 200, 202 (or the projections or recesses 800, 802) and such that a spring can bias the housings to a folded position, thereby releasably clamping or otherwise fastening to or holding the object in a substantially fixed position with respect to the housings 200, 202. The axle 608 is spaced far enough from the mating ends 214, 222 of the first and second housings 200, 202, respectively, to allow a user to grip the mating ends 214 and 222 and move the mating ends 214, 222 toward one another in a pinching action, as shown in FIG. 12. Movement of the mating ends 214, 222 toward one another forces the first and second ends 208, 216 apart to receive the object to which the portable electronic device 100 is to be fastened. The spring 610 biases the first and second ends 208, 216 toward one another so that when the mating ends 214, 222 are released, the folded portable electronic device 100 exerts a clamping force on the object.

Figures 13A, 13B:
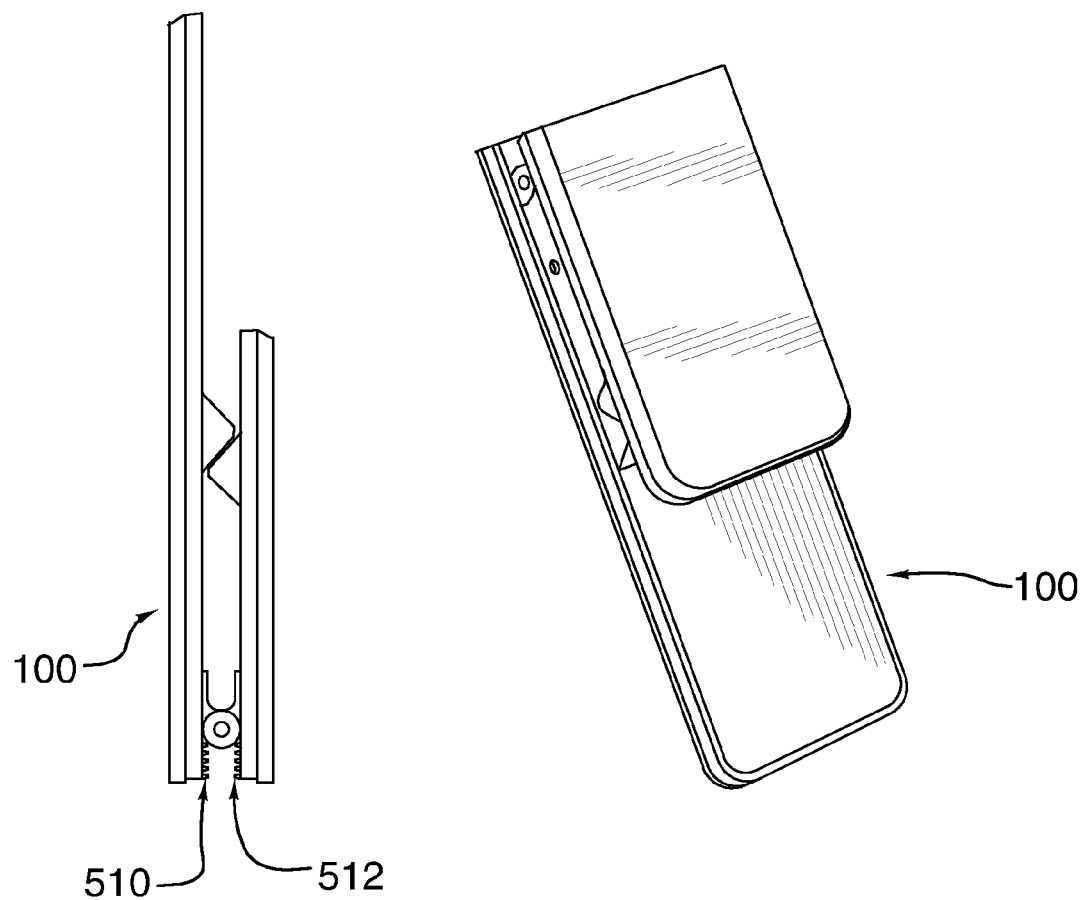
FIG. 13A is a side view of a portable electronic device according to another example.
FIG. 13B is an isometric view of the portable electronic device of FIG. 13A.

Referring to FIGS. 13A and 13B, the portable electronic device 100 is shaped to be useable as a tie clip. In this example, the first housing 200 is longer than the second housing 202.

Figure 14:
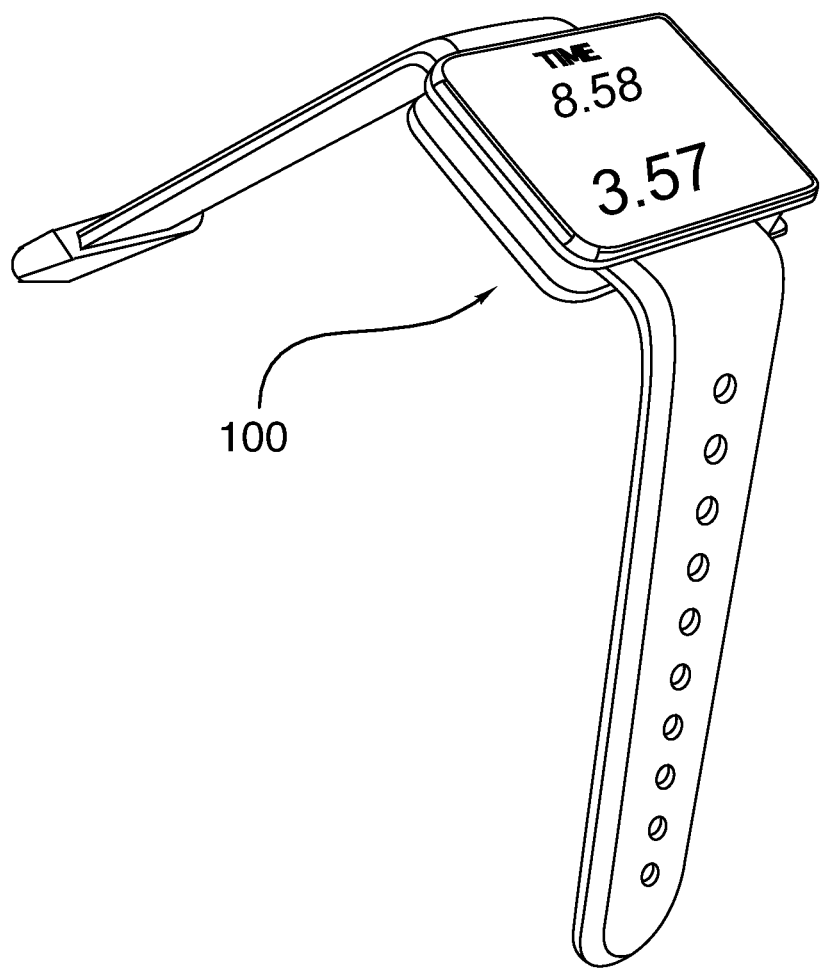
FIG. 14 is an isometric view of a portable electronic device according to another example.

Referring to FIG. 14, in another example, the portable electronic device 100 is shaped to be usable as a watch that is securable to a watch band.

Figure 15:
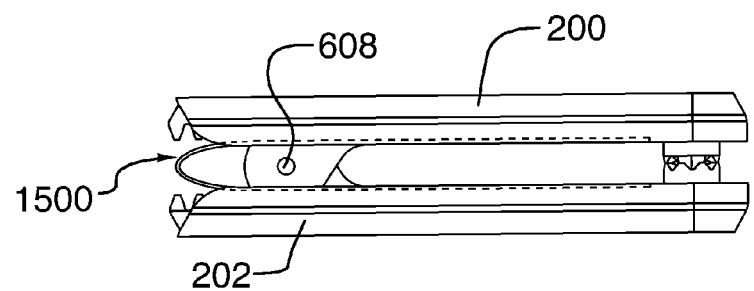
FIG. 15 is a side view of the portable electronic device according to another example, in a folded position.
Figure 16:
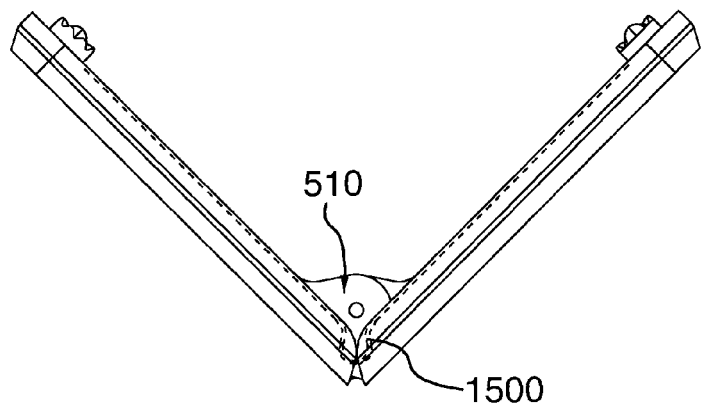
FIG. 16 is a side view of the portable electronic device of FIG. 15, in a partially folded position.
Figure 17:
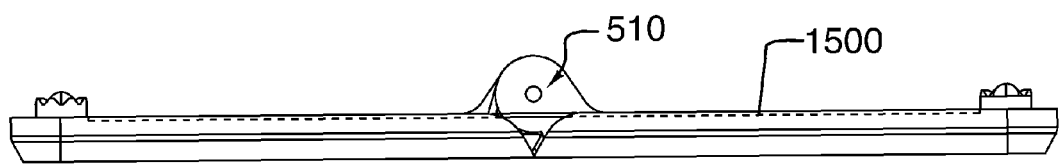
FIG. 17 is a side view of the portable electronic device of FIG. 15, in an open position.

Referring to FIGS. 15 to 17, another example of a portable electronic device 100 is generally shown. The portable electronic device 100 is similar to the example portable electronic devices previously described and further includes a flexible Printed Circuit Board (PCB) 1500.

The flexible PCB extends at least part way through both the first housing 200 and the second housing 202 and includes the processor 102 and other electrical components of the portable electronic device 100. The flexible PCB 1500 is sized to avoid the hinge assemblies 510, 512 so that no interference occurs between the flexible PCB 1500 and the hinge assemblies 510, 512 when moving the portable electronic device 100 from the open position to the folded position and vice versa. The flexible PCB 1500 is coupled to the housings 200, 202. Because the hinge assemblies 510, 512 cause the housings 200, 202 to be spaced from one another when the portable electronic device 100 is in the folded position, sufficient space is provided to avoid bulging of the flexible PCB 1500 from the portable electronic device 100 and avoid excessive bending of the flexible PCB.

Figure 18:
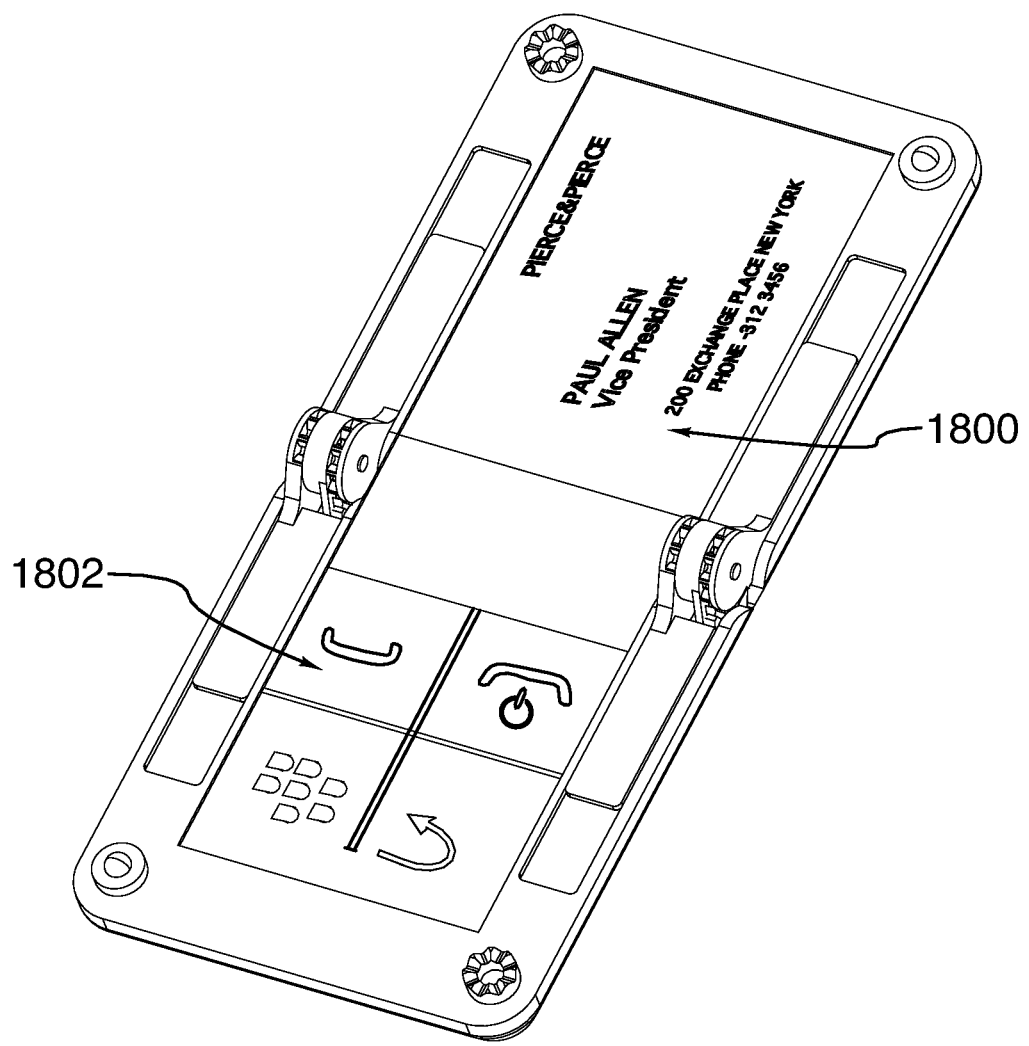
FIG. 18 is an isometric view of a back of a portable electronic device according to still another example.

In the example portable electronic devices 100 that have been described, the first rear surface 604 and the second rear surface 606 form part of the housings 200, 202 and do not include any additional functionality. In another example, which is shown in FIG. 18, the first rear surface 604 includes a secondary display 1800 and the second rear surface 606 includes buttons 1802, which control some operations of the portable electronic device 100. Further, the projections 600 and recess 602 may also function as charging contacts. When in the open position, the electronics associated with both the front and rear of the portable electronic device 100 may be active at the same time. Alternatively, only one side of the portable electronic device 100 may be operable at a given time.

Figure 19:
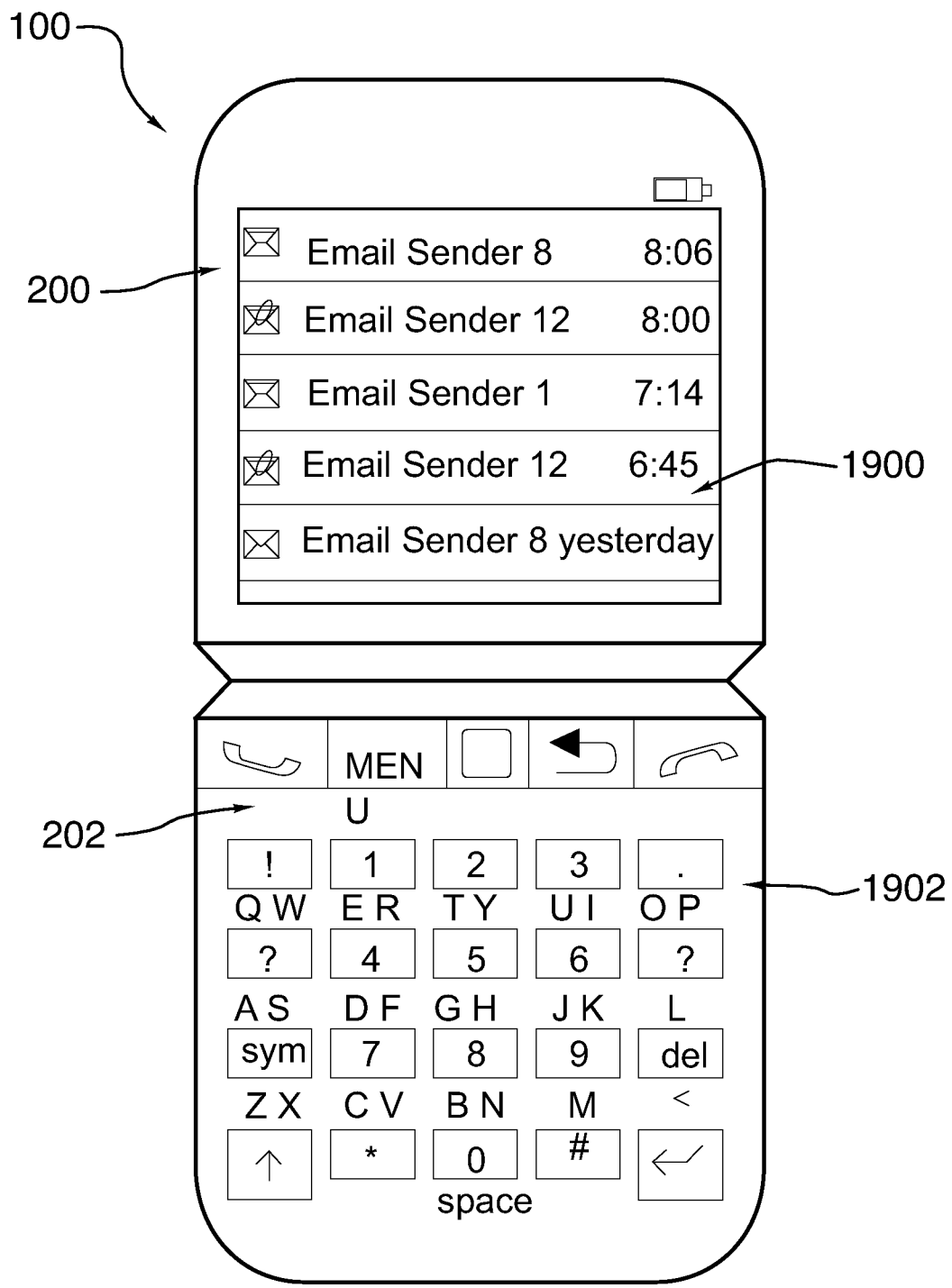
FIG. 19 is a front view of a portable electronic device according to another example in an open position.
Figure 20:
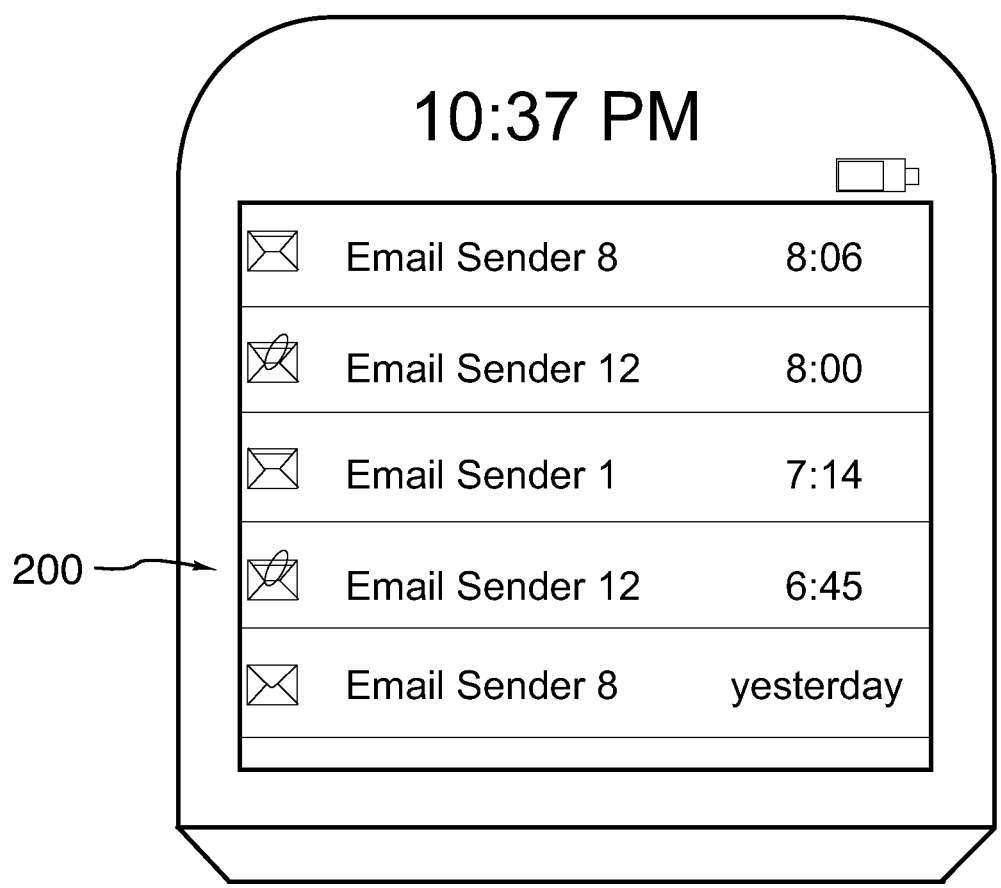
FIG. 20 is a front view of the portable electronic device of FIG. 21 in the folded position.

Referring to FIGS. 19 and 20, another example of a portable electronic device 100 is shown. The portable electronic device 100 includes an LCD display 1900 and a keyboard 1902. The portable electronic device 100 includes hinge assemblies (not shown) so that first and second housings 200, 202 may be moved from the open position of FIG. 19 to the folded position of FIG. 20.

The hinge assemblies 510, 512 disclosed herein are described as being generally identical; however, the hinge assemblies 510 and 512 may be different. Further, although the examples disclosed herein include a pair of hinge assemblies, a single hinge assembly may be provided. The single hinge assembly may be centrally located or may be located close to one side of the portable electronic device 100.

Although a rack and pinion type arrangement has been disclosed, it will be appreciated by a person skilled in the art that other arrangements for achieving a rolling hinge when moving the portable electronic device 100 between the open position and the folded position may be provided. Examples include: a cable and pulley arrangement coupling the first housing 200 to the second housing 202, an off-centre pivot and linkage coupling the first housing 200 to the second housing 202 or a cam arrangement in which the housings 200, 202 include overhanging parts that interact with one another. In these arrangements, when the angle between the housings 200, 202 changes during opening and folding, lateral movement of an axle or rotation axis also occurs.

The portable electronic device disclosed herein operates as a clip that is formed by the individual housing components of the portable electronic device. As such, clips that are external to the device may be eliminated, which reduces the overall size of the portable electronic device, particularly if the portable electronic device is carried within a case incorporating the clip. When in the folded position, the portable electronic device operates in a manner that is similar to a clothespin, therefore, is simple to operate and does not require extensive learning by the user.

The hinge assemblies of the portable electronic device determine the position of the first and second housings 200, 202 relative to one another between the open and folded positions resulting in a smooth and controlled feel for the user operating the portable electronic device.

One or more embodiments set out in this disclosure may realize one or more benefits, some of which have been suggested already. Mechanisms that support hinged connection of a first housing and a second housing and mechanisms that support electrical communication between housings, can also support clipping. As previously mentioned, the clipping function can be easy to use. Although the mechanisms may work in concert with other clipping mechanisms, some embodiments may eliminate other kinds of clips altogether, or may reduce a demand for carrying devices having clips, such as holsters or some carrying cases. Various embodiments may be adaptable to various devices having various physical configurations and functions and sizes, and some of the embodiments may be advantageous in that they can be readily miniaturized. The embodiments described herein may not only change or improve the way in which a portable electronic device functions, some embodiments may also change or improve the aesthetics of a portable electronic device. In some instances, for example, a portable electronic device may be attached to clothing such that it can present itself as a fashion accessory or as jewelry or as an emblem or as another type of decoration.

Other possible benefits that may be realized by the embodiments described herein include protection from the environment, protection from impacts, enhanced privacy and/or greater compactness, for example.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A portable electronic device comprising:
a first housing comprising a first end and a first mating end;
a second housing comprising a second end and a second mating end;
a hinge assembly comprising an axle, the hinge assembly coupling the first mating end of the first housing to the second mating end of the second housing, the second housing being movable relative to the first housing from an open position in which the axle is in a first position near to the first mating end and the second mating end and a folded position in which the axle is in a second position spaced from the first mating end and the second mating end, the first housing being spaced from the second housing at the first and second mating ends in the folded position such that the first mating end and the second mating end are movable toward one another to move the portable electronic device to a partially open position for clipping to an object; and
a processor in electrical communication with electrical components in one of the first housing and the second housing.

2. A portable electronic device as claimed in claim 1, comprising a spring coupled to the first housing and the second housing, the spring for biasing the portable electronic device to the open position when almost open and for biasing the portable electronic device to the folded position when in the partially open position.

3. A portable electronic device as claimed in claim 1, wherein the hinge assembly comprises a pair of pinions for engaging a pair of racks, one of the pair of pinions being coupled to the first housing and the other of the pair of pinions being coupled to the second housing.

4. A portable electronic device as claimed in claim 1, wherein the hinge assembly comprises an outer rack coupled to the first housing, an inner rack coupled to the second housing, an inner pinion slidably coupled to the first housing and an outer pinion slidably coupled to the second housing, the inner pinion in engagement with the inner rack and the outer pinion in engagement with the outer rack.

5. A portable electronic device as claimed in claim 4, wherein the first housing and the outer rack are a single part.

6. A portable electronic device as claimed in claim 4, wherein the second housing and the inner rack are a single part.

7. A portable electronic device as claimed in claim 4, wherein the inner pinion includes a pinion body extending from an arm that is slidably received in a channel of the first housing.

8. A portable electronic device as claimed in claim 1, comprising a display exposed by the first housing.

9. A portable electronic device as claimed in claim 1, comprising a flexible printed circuit board extending between the first housing and the second housing.

10. A portable electronic device as claimed in claim 1, wherein the distance between the first position of the axle and the second position of the axle is between 10 and 50 percent of the length of the first housing.

11. A portable electronic device as claimed in claim 1, comprising two hinge assemblies spaced from one another along a width of the portable electronic device.

12. A portable electronic device as claimed in claim 1, wherein the first housing and the second housing are generally the same length.

13. A portable electronic device comprising:
   a first housing comprising a first end and a first mating end;
   a second housing comprising a second end and a second mating end;
   a hinge assembly comprising an axle, the hinge assembly coupling the first mating end of the first housing to the second mating end of the second housing, the second housing being movable relative to the first housing from an open position in which the axle is in a first position near to the first mating end and the second mating end and a folded position in which the axle is in a second position spaced from the first mating end and the second mating end such that the first mating end and the second mating end are movable toward one another to move the portable electronic device to a partially open position for clipping to an object;
   projections located on a rear surface of the first housing at the first end for abutting a rear surface of the second housing; and
   a processor in electrical communication with electrical components in one of the first housing and the second housing.

14. A portable electronic device as claimed in claim 13, wherein the projections abut mating recesses located on a rear surface of the second housing at the second end.

15. A portable electronic device as claimed in claim 14, wherein the projections are magnets and the mating recesses are made of a ferrous material.

* * * * *